(12) United States Patent
Qu et al.

(10) Patent No.: US 9,796,906 B2
(45) Date of Patent: Oct. 24, 2017

(54) MULTIPLE HYDROPHILIC HEAD HYDRATE INHIBITORS

(71) Applicant: Multi-Chem Group, LLC, San Angelo, TX (US)

(72) Inventors: Liangwei Qu, Spring, TX (US); Yangqiu Sun, Houston, TX (US); Funian Zhao, Tomball, TX (US); Curtis Conkle, Conroe, TX (US); Erick J. Acosta, Sugar Land, TX (US)

(73) Assignee: Multi-Chem Group, LLC, San Angelo, TX (US)

( * ) Notice: Subject to any disclaimer, the term of this patent is extended or adjusted under 35 U.S.C. 154(b) by 0 days.

(21) Appl. No.: 14/765,460

(22) PCT Filed: May 5, 2014

(86) PCT No.: PCT/US2014/036738
§ 371 (c)(1),
(2) Date: Aug. 3, 2015

(87) PCT Pub. No.: WO2015/171104
PCT Pub. Date: Nov. 12, 2015

(65) Prior Publication Data
US 2016/0264843 A1  Sep. 15, 2016

(51) Int. Cl.
*C09K 8/52* (2006.01)
*C09K 8/524* (2006.01)
*C10L 3/10* (2006.01)

(52) U.S. Cl.
CPC .............. *C09K 8/524* (2013.01); *C09K 8/52* (2013.01); *C10L 3/107* (2013.01); *C09K 2208/22* (2013.01)

(58) Field of Classification Search
None
See application file for complete search history.

(56) References Cited

U.S. PATENT DOCUMENTS

| | | | |
|---|---|---|---|
| 5,817,898 A | 10/1998 | Delton et al. | |
| 2006/0237691 A1* | 10/2006 | Meier | C07C 217/08 252/397 |
| 2008/0064611 A1* | 3/2008 | Spratt | C09K 8/52 507/90 |
| 2009/0114879 A1 | 5/2009 | Hellsten et al. | |

(Continued)

OTHER PUBLICATIONS

International Search Report and Written Opinion in related application PCT/US2014/036738, mailed on Feb. 4, 2015. 12 pages.

(Continued)

*Primary Examiner* — Alicia Bland
(74) *Attorney, Agent, or Firm* — Tenley Krueger; Baker Botts L.L.P.

(57) ABSTRACT

Compounds comprising multiple hydrophilic heads and a lipophilic tail may be employed into fluids to inhibit agglomeration of hydrates, among other things. Suitable hydrophilic heads may include secondary, tertiary, and/or quaternary ammonium cation moieties, phosphonium cation moieties, and combinations thereof. Such LDHI compounds may provide enhanced interactivity with hydrate crystals and/or hydrate-forming molecules. These compounds may be employed in fluids in various environments, such as a conduit penetrating a subterranean formation, or a conduit carrying fluid in an industrial setting.

12 Claims, 4 Drawing Sheets

(56) References Cited

U.S. PATENT DOCUMENTS

2012/0161070 A1* 6/2012 Webber ............... C07C 237/06
252/182.29
2014/0094393 A1 4/2014 Webber

OTHER PUBLICATIONS

Huskens, J. "Multivalent interactions at interfaces," Current Opinion in Chemical Biology (2006), 10(6), 537-43.
Kelland, M.A., "History of the development of low dosage hydrate inhibitors," Energy & Fuels 20 (2006): 825.

* cited by examiner

MULTIPLE HYDROPHILIC HEAD HYDRATE INHIBITORS

CROSS-REFERENCE TO RELATED APPLICATION

The present application is a U.S. National Stage Application of International Application No. PCT/US2014/036738 filed May 5, 2014, which is incorporated herein by reference in its entirety for all purposes.

BACKGROUND

The present disclosure relates generally to compounds useful in processes involving fluid flowing through, or contained in, conduits such as pipes, such as the production of petroleum products, natural gas, and the like. More particularly, the present disclosure relates to compositions and the use of such compositions, such as in the inhibition of the formation of gas hydrate agglomerates.

Gas hydrates are solids that may agglomerate in a fluid that is flowing or is substantially stationary, under certain temperature and pressure conditions. For example, gas hydrates may form during hydrocarbon production from a subterranean formation, in particular in pipelines and other equipment during production operations. Hydrates may impede or completely block flow of hydrocarbons or other fluid flowing through such pipelines. These blockages not only may decrease or stop production, potentially costing millions of dollars in lost production, but also may be very difficult and dangerous to mediate. Unless properly handled, gas hydrates may be volatile and/or explosive, potentially rupturing pipelines, damaging equipment, endangering workers, and/or causing environmental harm.

Gas hydrates may form when water molecules become bonded together after coming into contact with certain "guest" gas or liquid molecules. Hydrogen bonding causes the water molecules to form a regular lattice structure, like a cage, that is stabilized by the guest gas or liquid molecules entrapped within the lattice structure. The resulting crystalline structure may precipitate as a solid gas hydrate. Guest molecules can include any number of molecules such as, for example, carbon dioxide, methane, butane, propane, hydrogen, helium, freon, halogen, a noble gas, and the like.

Figure 1:
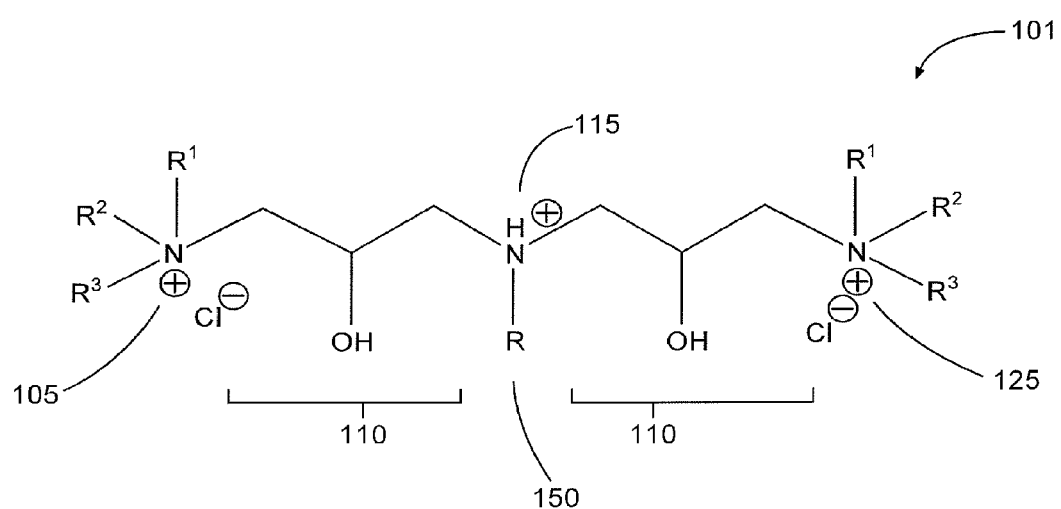
FIG. 1 is a diagram illustrating a compound that includes multiple quaternary cation moieties in accordance with aspects of the present disclosure.

While embodiments of this disclosure have been depicted and described and are defined by reference to certain embodiments, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and are not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells, monitoring wells, and production wells, including hydrocarbon or geothermal wells.

Hydrate inhibitors are often grouped into 3 general classes: thermodynamic, anti-agglomerate, and kinetic hydrate inhibitors. Thermodynamic inhibitors are believed to operate by shifting the hydrate formation phase boundary away from temperature and pressure conditions of a process by increasing the driving force required for formation of the hydrate. Such inhibitors may require high concentrations to be effective (e.g., up to 50% or 60% inhibitor by amount of water). Kinetic inhibitors and anti-agglomerate inhibitors may function at lower concentrations than thermodynamic inhibitors, and therefore may be termed low dosage hydrate inhibitors (LDHIs). Kinetic hydrate inhibitors may prevent or delay the nucleation of hydrates, thus limiting hydrate crystal size and growth. Anti-agglomerate LDHIs are believed to prevent or otherwise disrupt the agglomeration of hydrates.

The present disclosure relates generally to compounds useful in processes involving fluid flowing through, or otherwise contained in, conduits or vessels such as those used in the production of petroleum products, natural gas, and the like. More particularly, the present disclosure relates to compositions and the use of such compositions, such as in the inhibition of the formation of gas hydrate agglomerates.

In some embodiments, the present disclosure may provide a low-dosage hydrate inhibitor ("LDHI") compound comprising multiple hydrophilic heads and at least one hydrophobic tail (which may alternatively be referred to as a lipophilic tail). The compound according to certain embodiments may include exactly one hydrophobic tail. In certain other embodiments, the compound may include hydrophilic heads and tails in a ratio of 2 or more hydrophilic heads for every 1 lipophilic tail. The ratio of particular embodiments may be 3 hydrophilic heads to 1 lipophilic tail. Any two or more of the multiple hydrophilic heads may be bonded via one or more linking groups. In some aspects, the present disclosure may also or instead provide salts of such compounds. The present disclosure further provides methods of using such compounds and/or salts thereof. For example, some embodiments provide a method of inhibiting the formation of hydrate agglomerates in a fluid comprising any one or more of water, gas, hydrocarbons, and combinations thereof. Such a method could include adding to the fluid an effective amount of a composition comprising a compound according to the present disclosure, and/or salts thereof.

Among the many advantages provided herein, compounds and methods of using compounds according to the present disclosure may provide enhanced anti-agglomeration properties. For example, referring to embodiments relating to methods for inhibiting the formation of hydrate agglomerates: hydrate agglomeration may be inhibited to a greater degree than that using conventional means, and/or a smaller quantity of LDHI may inhibit hydrate agglomeration. In particular embodiments, compounds of the present disclosure may provide greater interaction between an LDHI and hydrate surface than is provided by conventional LDHIs.

In the LDHI compounds of the present disclosure, any one or more of the multiple hydrophilic heads of such embodiments may each comprise a cation moiety. Any one or more of the multiple heads may each comprise a quaternary cation moiety (e.g., a quaternary ammonium or quaternary phosphonium cation moiety). In particular embodiments, each of two or more of the multiple heads may comprise a quaternary cation moiety, such that the compound comprises two or more quaternary cation moieties. A quaternary cation moiety may be referred to herein as a "quat moiety" or alternatively as a "quat." A compound comprising two or more quats may be referred to herein alternatively as a "multiple quat," a "multi-quat," or a "multiple quaternary compound." A quat moiety located on an end-point of a compound according to some embodiments may be of the general structure $R^1R^2R^3M^+$-, where each R-group $R^1$, $R^2$, and $R^3$ may be any suitable moiety that maintains the hydrophilic nature of the quat moiety to which each of $R^1$, $R^2$, and $R^3$ is attached, and M may be nitrogen or phosphorus. For instance, the example embodiment shown in FIG. 1 includes two quat moieties 105 and 125 (shown in FIG. 1 where M is nitrogen) located at end-points of the molecule 101—that is, each quat moiety is bonded at only one location to the remainder of the compound. In some embodiments, a quat moiety may be included in the middle of a compound. In such embodiments, a quat moiety may have the general structure —$R^1R^2M^+$-, and the remaining moieties of the compound are bonded at each of two locations to this general structure.

In various embodiments, each R-group may be either the same or different with respect to the others. In some embodiments, each of $R^1$ and $R^2$ (and $R^3$, where present) may comprise an organic moiety such as any one or more of: alkyl, alkenyl, alkynyl, aryl, arylalkyl, arylalkenyl, alkylaryl, alkenylaryl, glycol, and combinations thereof. Each of $R^1$, $R^2$, and $R^3$ may be branched or normal. Each of $R^1$, $R^2$, and $R^3$ may be different, although any two or more of these R groups may be the same. Each of these R-groups may comprise approximately 1 to 20 carbon atoms. That is, each R-group may be a $C_1$ to $C_{20}$ hydrocarbon chain (excepting embodiments wherein the R-group comprises an alkenyl or alkynyl group, in which case at least 2 carbon atoms are necessary). In particular embodiments, each R-group may be a $C_1$ to $C_{12}$ hydrocarbon chain. As used herein, a "hydrocarbon chain" may, unless otherwise specifically noted, be substituted or unsubstituted (that is, it may or may not contain one or more additional moieties or functional groups in place of one or more hydrogens in the hydrocarbon chain); it may be branched, unbranched, acyclic, and/or cyclic; and/or it may be saturated or unsaturated. Furthermore, as used herein, the nomenclature "$C_x$ to $C_y$" refers to the number of carbon atoms in the hydrocarbon chain (here, ranging from x to y carbon atoms).

An R-group hydrocarbon chain according to various embodiments may be either substituted or unsubstituted, and/or branched or unbranched, and/or cyclic or non-cyclic, and/or saturated or unsaturated. Thus, an R-group of some embodiments may comprise a $C_1$ to $C_{10}$ alkyl chain (branched or unbranched), or in other embodiments a $C_2$ to $C_6$ alkyl, alkenyl, or alkynyl chain (branched or unbranched), or in yet other embodiments a $C_2$ to $C_8$ alkyl, alkenyl, or alkynyl chain (branched or unbranched). Similarly, an R-group may comprise a $C_3$ to $C_{10}$ aryl moiety (and likewise for $C_3$ to $C_6$ moieties). Some embodiments may include R-groups of variously sized hydrocarbon chains, such as a hydrocarbon chain having as few as any one of: 1, 2, 3, 4, 5, 6, 7, 8, 9, and 10 carbon atoms; and as many as any one of: 2, 3, 4, 5, 6, 7, 8, 9, 10, 11, 12, 13, 14, 15, 16, 17, 18, 19, and 20 carbon atoms. As noted, an R-group according to some embodiments may include other groups in addition to the hydrocarbon groups described above (e.g., it may include a substituted hydrocarbon chain), so long as the quat moiety remains hydrophilic. An R-group of any quat moiety of a compound according to some embodiments may be smaller than the lipophilic tail of such compound.

As noted, some compounds according to the present disclosure may include multiple quats. In such instances, any two or more quat moieties may be isomeric and/or stereoisomeric with respect to each other (that is, each of two or more quats may be of the general structure $R^1R^2R^3M^+$- with each R-group as described above, or each of two or more quats may be of the general structure —$R^1R^2M^+$- when incorporated into the middle of the compound). In some embodiments, any one or more quat moieties may include a different set of R-groups (e.g., a set of R-groups whose identities are only partially overlapping or entirely non-overlapping with respect to the identities of R-groups of another quat moiety). Thus, taking for example the case with entirely non-overlapping R-groups, some embodiments may comprise a first quat moiety having general structure $R^1R^2R^3M^+$- and a second quat moiety having general structure $R^4R^5R^6M^+$, where each of $R^4$, $R^5$, and $R^6$ may have a general structure according to the principles discussed above with respect to R-groups $R^1$, $R^2$, and $R^3$.

Other suitable hydrophilic heads according to some embodiments may include any one or more of: tertiary ammonium or phosphonium cation moieties (e.g., ammonium cation moieties and/or phosphonium cation moieties of the general structures discussed above wherein one R-group is hydrogen); secondary ammonium or phosphonium cation moieties (likewise, wherein each of two R-groups are hydrogen); and/or primary ammonium or phosphonium cation moieties ($H_3N^+$— or $H_3P^+$—). In certain embodiments, a hydrophilic head need not necessarily be a cation moiety. For instance, an amine or phosphine moiety of some compounds according to various embodiments may constitute a hydrophilic head. In some embodiments, whether an amine or phosphine may be a hydrophilic head may depend at least in part upon the groups appended thereto. In some embodiments, a hydrophilic head of an LDHI may include any moiety that tends to be attracted to water and other polar substances.

Any two or more of the multiple hydrophilic heads may be joined indirectly by a linking group. A linking group may be any moiety suitable for linking two hydrophilic heads. For example, FIG. 1 shows example linking groups 110, each of which is a hydroxypropyl moiety linking, respectively, hydrophilic heads 105 and 115, and hydrophilic heads 125 and 115. Other linking groups may be suitable, such as any hydrocarbon chain. In particular embodiments, the hydrocarbon chain may be substituted, for instance with a functional group comprising any one or more of: ether, ester, carbonyl, carboxyl, sulfonyl, sulfonic ester, carboxylic ester, hydroxyl, alkane, alkene, alkyne, and combinations thereof. In some embodiments, the substituted group may comprise a long or short-chain polymer (e.g., polyethylene oxide (PEO), and/or polypropylene oxide (PPO)). In some embodiments, the linking group may be of a length that both (i) maintains the hydrophilic nature of each hydrophilic head and (ii) provides adequate spacing between hydrophilic heads such that each head may distinctly interact with water or another polar substance independently of any other hydrophilic head.

As previously noted, a compound according to some embodiments may further include a lipophilic tail (sometimes alternatively referred to as a hydrophobic tail), such as tail 150 shown in the example compound of FIG. 1, denoted therein as R. In certain embodiments, a compound may include exactly one lipophilic tail R. A lipophilic tail R may be bonded directly to a hydrophilic head moiety. The example compound of FIG. 1 shows a lipophilic tail 150 directly bonded to a hydrophilic head 115, shown in FIG. 1 as a tertiary ammonium ion. The tail may be of sufficient length and composition to retain lipophilic and/or hydrophobic properties. By way of example, the tail R of some embodiments may comprise a $C_3$ to $C_{50}$ hydrocarbon chain. An LDHI compound according to particular embodiments may include multiple lipophilic tails. In certain of these embodiments, the LDHI compound may additionally include two or more hydrophilic heads for each lipophilic tail.

The $C_3$ to $C_{50}$ hydrocarbon chain of the tail R may in some embodiments be unsubstituted or substituted, and/or branched or unbranched, and/or saturated or unsaturated. It may comprise any one or more of alkyl, alkenyl, alkynyl, and aryl groups, and/or combinations thereof. As noted, the chain may optionally be substituted with any one or more additional groups, but such substituted additional group or groups should not alter the lipophilic and/or hydrophobic nature of the tail. In particular embodiments, the tail may comprise (i) as few as any one of: 3, 4, 5, 6, 7, 8, 9, 10, 11, 12, 13, 14, 15, 16, 17, 18, 19, and 20 carbons, and (ii) as many as any one of: 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, and 50 carbons. For example, suitable ranges of carbon atoms in the tail according to various embodiments include: 3 to 5, 4 to 8, 5 to 15, 8 to 18, 8 to 20, 10 to 20, 15 to 20, etc. In particular embodiments, the lipophilic tail R may include more carbon atoms than any one of the R-groups of each of the multiple hydrophilic heads. Thus, in such embodiments having R-groups of two cationic heads that include methyl, propyl, and hexyl groups, the lipophilic tail R may include at least 7 carbon atoms.

Compounds according to some embodiments may instead or in addition be characterized as reaction products. For example, the present disclosure in some embodiments provides a compound that may be characterized as the reaction product of: (1) the reaction product of a long-chain primary amine and an epihalohydrin; and (2) a tertiary amine. Put another way, compounds of such embodiments may be characterized as the product of a two-step reaction: (1) R—$NH_2$+2[epihalohydrin]; and (2) [product of reaction (1)]+$R^1R^2R^3N$. Each reaction step may be carried out at approximately room temperature (e.g., about 20° C. to about 24° C.). In some embodiments, each reaction step may be carried out at any temperature ranging from about 20 to about 80° C. at approximately atmospheric pressure. The epihalohydrin may comprise epichlorohydrin, epibromohydrin, epifluorohydrin, epiiodohydrin, and combinations thereof.

In this scheme, the resultant product may include organic moiety R of the long-chain primary amine as lipophilic tail R; thus, the possible identities of organic moiety R may be the same as previously discussed with respect to lipophilic tail R (notwithstanding the moniker "long-chain," which is not intended to imply that a particular structure of R is required in any embodiment, other than as discussed previously with respect to lipophilic tail R as seen in various embodiments). Specific examples of suitable long-chain primary amine include cocoamine, tallow amine, oleyl amine, stearyl amine, lauryl amine, combinations of any two or more of the foregoing, and other long-chain primary amines having organic moiety R with characteristics in accordance with the lipophilic tail R discussed above (as well as combinations thereof). Similarly, R-groups $R^1$, $R^2$, and $R^3$ of the tertiary amine (and/or phosphine) may be in accordance with those R-groups previously discussed with respect to quaternary cations. In yet further embodiments, however, a secondary amine may be used instead of or in addition to tertiary amine in the second reaction step. In such instances, one of R-groups $R^1$, $R^2$, and $R^3$ is H, and the resultant product may still include multiple quaternary ammonium cations, although it may instead include multiple tertiary ammonium cations, and/or a mixture of tertiary and quaternary ammonium cations. Specific examples of suitable secondary and/or tertiary amine $R^1R^2R^3N$ for use in the second step of reaction may therefore include dimethylcocoamine, triethylamine, tripropylamine, tributylamine, tripentylamine, N,N-dimethylaniline, N,N-diethylaniline, dimethylisopropaneamine, dimethylbutylamine, dipropylamine, and combinations thereof. The ultimate reaction product may accordingly include multiple quat moieties (and/or tertiary ammonium cation moieties to the extent secondary amines are used in reaction), each having general structure $R^1R^2R^3N$— (where each of $R^1$, $R^2$, and $R^3$ may be an R-group in accordance with those discussed previously, and/or one of $R^1$, $R^2$, and $R^3$ may be H).

Particular embodiments may provide the reaction product of a synthesis method according to the foregoing, except using (i) a long-tail primary phosphine in place of the long-tail primary amine, and (ii) a secondary or tertiary phosphine in place of the secondary or tertiary amine. And in yet other embodiments, a combination of long-tail primary phosphine and long-tail primary amine may be used in the first reaction step, and a combination of (i) secondary or tertiary phosphine and (ii) secondary or tertiary amine may be used in the second reaction step.

Figure 2:
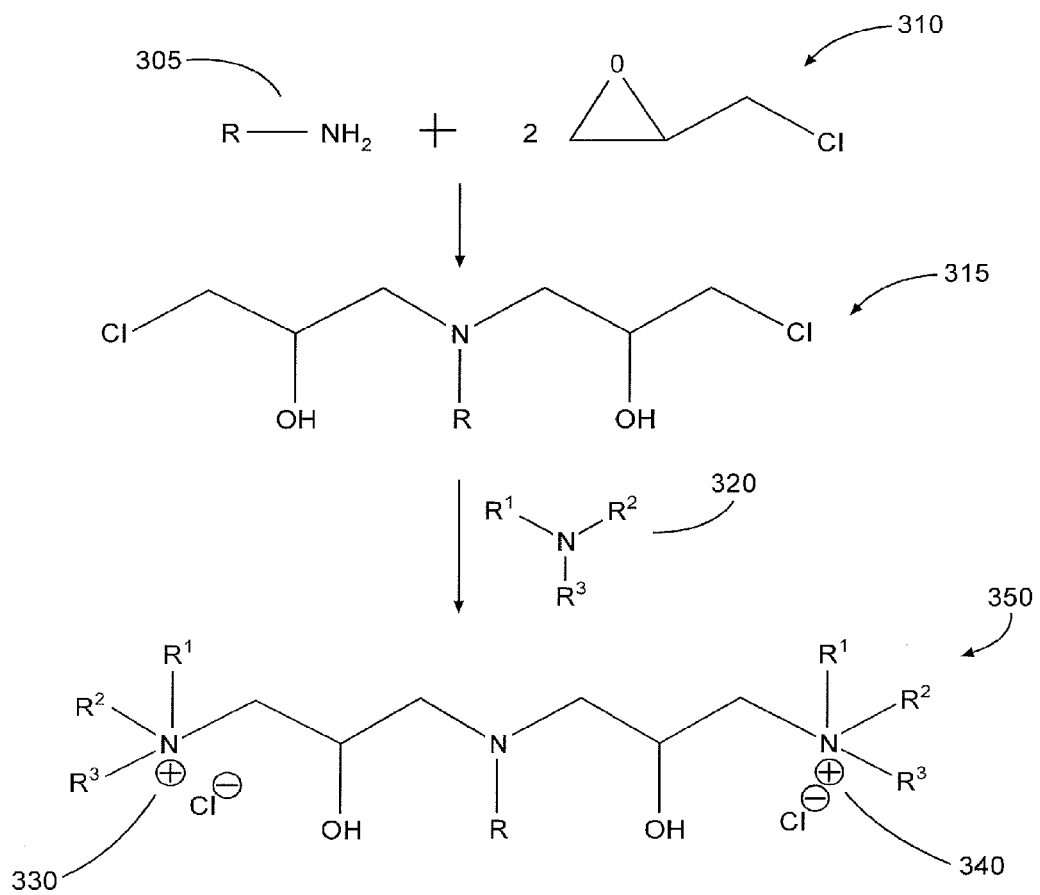
FIG. 2 is a diagram illustrating a reaction process in accordance with aspects of the present disclosure.

Thus, a reaction product 350 may result from the synthesis steps shown in FIG. 2, in accordance with the immediately preceding discussion. As shown in the example process of FIG. 2, 1 mole of primary amine 305 reacts with 2 moles epihalohydrin 310 (shown in FIG. 2 as epichlorohydrin). The product 315 of this reaction is then in turn reacted with tertiary amine 320 (as noted previously, this could be replaced by any of: secondary amine, secondary phosphine, tertiary amine, tertiary phosphine, and combinations thereof), yielding a compound 350 comprising multiple hydrophilic heads (330, 340) according to the present disclosure. As shown in FIG. 2, the cation moieties 330 and 340 of the compound 350 are each associated (e.g., ionically bonded or otherwise associated) with chloride ions, making the compound 350 a quaternary ammonium salt. Such salts may wholly or partially dissociate in aqueous or oligeous solution and/or solvents, and/or such salts may associate with different anions. It will further be appreciated by one of ordinary skill in the art with the benefit of this disclosure that salts may initially be formed with other anions instead of or in addition to chloride anions. For instance, suitable anions may comprise any one or more of hydroxide, carboxylate, halide, sulfate, organic sulfonate, and combinations thereof. Accordingly, when a compound comprising cation moieties is referred to herein, it should be understood that such reference may alternately include both the salt form and the dissociated form (that is, having at least one cation moiety not associated with an anion) of the compound, unless specifically noted otherwise.

Figure 3:
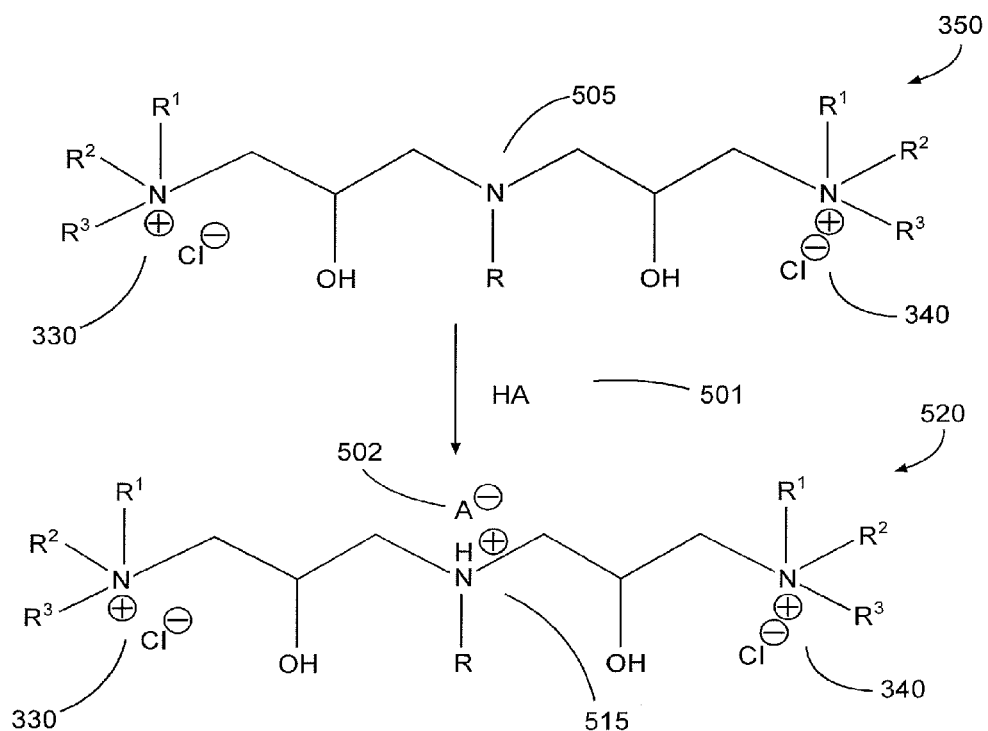
FIG. 3 is a diagram illustrating an acid reaction process in accordance with aspects of the present disclosure.

Furthermore, a compound and/or its salt may further react with acids, including acetic acid, acrylic acid, hydrochloric acid, or any other suitable acid. Such further reaction may in some embodiments create an additional cationic hydrophilic head. Returning to the example embodiment shown by the reaction process of FIG. 2, the compound 350 may be reacted as shown in FIG. 3 with acid 501, resulting in protonation of the central amine 505 of 350, thereby creating additional cationic hydrophilic head 515. The resultant product 520 may exist in some embodiments as a salt with the conjugate base 502 of the acid 501.

In certain embodiments, a multiple hydrophilic head compound may include or be: an aminoammonium compound (and/or a salt thereof), a phosphinophosphonium compound; an aminophosphonium compound; a phosphinoammonium compound; a multi-ammonium compound (e.g., a compound having 2 or more ammonium moieties); and/or a multi-phosphonium compound (e.g., a compound having 2 or more phosphonium moieties). For example, some embodiments may include a compound having the following structural formula:

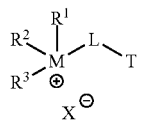

wherein each of $R^1$, $R^2$, and $R^3$ may be H or any hydrocarbon chain in accordance with discussion of R-groups $R^1$, $R^2$, and $R^3$ above; M may be nitrogen or phosphorus; X may be any anion (e.g., halide, a carboxylate, a sulfate, organic sulfonate, hydroxide, and/or combinations thereof); L may be a suitable linking group (e.g., a $C_1$ to $C_{20}$ hydrocarbon chain); and T may be an amine, ammonium, phosphine, or phosphonium. Moreover, in particular embodiments, only one of $R^1$, $R^2$, and $R^3$ may be H (thereby forming a tertiary cation moiety at M). In yet other embodiments, two of $R^1$, $R^2$, and $R^3$ may be H (thereby forming a secondary cation moiety at M).

As noted, L may be a suitable linking group, including e.g. a $C_1$ to $C_{20}$ hydrocarbon chain. In particular embodiments, L may have the following structural formula (e.g., it may be a substituted propyl chain, with substitution according to the following structure):

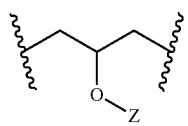

Z may be selected from the group consisting of: H, $R_7(CO)$—, $(CH_2CH_2O)_n$-, $(CH_2CH(CH_3)O)_n$-, $R_7SO_2^-$, $R_7(SO_2)O$—, $R_7$, and combinations thereof. $R_7$ may be a $C_1$ to $C_{20}$ hydrocarbon chain. Each n may be an integer ranging from 1 to 10.

Furthermore, as also noted, T may be an amine, ammonium, phosphine, or phosphonium. In particular embodiments, T may be selected from the group consisting of compounds having the following structural formulas:

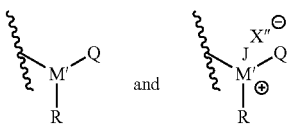

In such embodiments, M' is either phosphorus or nitrogen. R may be any hydrocarbon chain in accordance with discussion of lipophilic tail R above. Where present, J may be any one of: H, a $C_1$ to $C_6$ hydrocarbon chain, and combinations thereof. Where present, X" may independently be any ion that X could be. In each structure of T, Q may be H or an organic group. In particular, in some embodiments Q may be a $C_1$ to $C_{20}$ hydrocarbon chain, or a $C_1$ to $C_{10}$ hydrocarbon chain, or a $C_1$ to $C_6$ hydrocarbon chain. In certain embodiments, Q may be a substituted hydrocarbon chain including an additional amine, ammonium, phosphine, or phosphonium moiety, such as an alkyl, alkenyl, alkynyl, or aryl amine, or an alkyl, alkenyl, alkynyl, or aryl phosphine; or an alkyl, alkenyl, alkynyl, or aryl ammonium moiety, or an alkyl, alkenyl, alkynyl, or aryl phosphonium moiety, or combinations thereof. For instance, Q may have the structure:

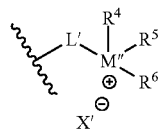

where L' may independently be any structure that L may be, as discussed above; M" may be nitrogen or phosphorus; X' may independently be any anion that X may be, as discussed above; and each of $R^4$, $R^5$, and $R^6$ may independently be H or any hydrocarbon chain according to $R^1$, $R^2$, and $R^3$ discussed above. In particular embodiments, the LDHI compound may be symmetrical about the central amine or phosphine (or, where applicable—such as in the case of salts—around the central ammonium or phosphonium moiety). In such instances, L' is the same as L, and each of $R^4$, $R^5$, and $R^6$ is identical to each of $R^1$, $R^2$, and $R^3$, respectively.

In various embodiments, any one or more of the foregoing R-groups $R^1$ through $R^6$ may be unsubstituted. Likewise, in some embodiments, R may be unsubstituted.

Compounds including multiple hydrophilic heads and one or more lipophilic tails according to the foregoing, and/or their salts, may be surfactants, and/or may have surfactant-like properties. For instance, they may, among other things, concentrate near water-hydrocarbon interfaces and emulsify water into the hydrocarbon phase. They may, in certain embodiments, act as dispersants that could prevent water molecules from aggregating around guest gas or other fluid molecules to form hydrates. In particular embodiments, an LDHI compound may attach to and/or disperse fine hydrate particles to prevent or inhibit agglomeration of such particles.

As previously noted, the present disclosure in some embodiments further provides methods of using compounds according to the present disclosure. In particular embodiments, the compounds may be employed as LDHIs. Thus, the present disclosure may provide a method of inhibiting the formation of hydrate agglomerates in a fluid comprising any one or more of water, gas, liquid hydrocarbon, and combinations thereof, the method comprising adding to the fluid an effective amount of LDHI compound. The LDHI compound may comprise multiple hydrophilic heads, a lipophilic tail, and a linking group, in accordance with compounds discussed with respect to various embodiments herein. The fluid may be flowing or it may be substantially stationary. In some instances, the fluid may exist in a high-pressure, low-temperature environment.

Some embodiments may include introducing a composition comprising an LDHI compound as described herein (e.g., a compound that includes multiple hydrophilic heads, a lipophilic tail, and a linking group), and/or a salt of such a compound, to a fluid comprising water and any one or more of gas, liquid hydrocarbon, and combinations thereof. Although listed separately from liquid hydrocarbon, the gas may in some embodiments include gaseous hydrocarbon, though the gas need not necessarily include hydrocarbon. The composition may be any suitable composition in which the LDHI compound may be included. For example, in some embodiments, the composition may be a treatment fluid for use in a wellbore penetrating a subterranean formation during, for instance, oil and/or gas recovery operations. The composition may include a solvent for the LDHI compound. Suitable solvents include any one or more of: toluene, xylene, methanol, isopropyl alcohol, any alcohol, glycol, any organic solvent, and combinations thereof. In some embodiments, the composition may include an acid, such as propenoic or acrylic acid, acetic acid, hydrochloric acid, citric acid, an organic acid, and combinations thereof, or any other suitable acid(s) so as to enable acidization reaction with the LDHI compound to create an additional cation moiety on the LDHI compound, as discussed above. The fluid may be within a vessel, or within a conduit (e.g., a conduit that may transport the fluid), or within a wellbore and/or a subterranean formation. Examples of conduits include, but are not limited to, pipelines, production piping, subsea tubulars, process equipment, and the like as used in industrial settings and/or as used in the production of oil and/or gas from a subterranean formation, and the like. The conduit may in certain embodiments penetrate at least a portion of a subterranean formation, as in the case of an oil and/or gas well. In particular embodiments, the conduit may be a wellbore or may be located within a wellbore penetrating at least a portion of a subterranean formation. Such oil and/or gas well may, for example, be a subsea well (e.g., with the subterranean formation being located below the sea floor), or it may be a surface well (e.g., with the subterranean formation being located belowground). A vessel or conduit according to other embodiments may be located in an industrial setting such as a refinery (e.g., separation vessels, dehydration units, pipelines, heat exchangers, and the like).

Methods according to some embodiments may further include allowing the LDHI compound to concentrate at an oil-water interface in the fluid (e.g., an interface between water and gas in the fluid, and/or between water and liquid hydrocarbon).

The compound in some embodiments may be introduced in an amount equal to about 0.1 to about 5.5% volume based on water in the fluid (or in other words, about 0.1% to about 3.0% volume based on water cut). In various embodiments, an effective amount of compound for inhibiting hydrates may be as low as any of: 0.1, 0.25, 0.50, 0.75, 1.00, 1.25, 1.50, 1.75, 2.00, 2.25, and 2.50% volume based on water cut. An effective amount may be as high as any of: 0.50, 0.75, 1.00, 1.25, 1.50, 1.75, 2.00, 2.25, 2.50, 2.75, 3.00, 3.25, 3.50, 3.75, 4.00, 4.50, 5.00, and 5.50% volume based on water cut. Thus, in particular embodiments, an effective amount of compound for inhibiting agglomeration of hydrates may be about 0.1 to about 3% volume based on water cut of the fluid; in other embodiments, about 0.1 to about 2% volume; in further embodiments, about 0.25 to about 1.5% volume; and in yet other embodiments, about 0.5 to about 1.0% volume.

Furthermore, the compound in certain embodiments may be introduced to any of various fluids having different water cuts. For example, in some embodiments the water cut may be about 30 to about 50%. In other embodiments, the water cut may be as low as any one of: 20, 25, 30, 35, 40, 45, and 50%; while the water cut may be as high as any one of 35, 40, 45, 50, 55, 60, 65, 70, 75, 80, 85, 90, and 95%. In certain embodiments, a fluid may have a water cut of 50% or more, 40% or more, or 30% or more, up to about 99%. In yet other embodiments, an LDHI compound may be used in a fluid with any water cut ranging from about 1% to about 99%.

The hydrate inhibitors of the present disclosure may be introduced into a well bore, subterranean formation, vessel, and/or conduit (and/or to a fluid within any of the foregoing) using any method or equipment known in the art. For example, these hydrate inhibitors may be applied to a subterranean formation and/or well bore using batch treatments, squeeze treatments, continuous treatments, and/or combinations thereof. In certain embodiments, a batch treatment may be performed in a subterranean formation by stopping production from the well and pumping the dissolved hydrate inhibitors into a well bore, which may be performed at one or more points in time during the life of a well. In other embodiments, a squeeze treatment may be performed by dissolving the hydrate inhibitor in a suitable solvent at a suitable concentration and squeezing that solvent carrying the hydrate inhibitor downhole into the formation, allowing production out of the formation to bring the hydrate inhibitor to its desired location. In still other embodiments, a hydrate inhibitor of the present disclosure may be injected into a portion of a subterranean formation using an annular space or capillary injection system to continuously introduce the hydrate inhibitor into the formation. In certain embodiments, a composition (such as a treatment fluid) comprising a hydrate inhibitor of the present disclosure may be circulated in the well bore using the same types of pumping systems and equipment at the surface that are used to introduce treatment fluids or additives into a well bore penetrating at least a portion of the subterranean formation.

Figure 4:
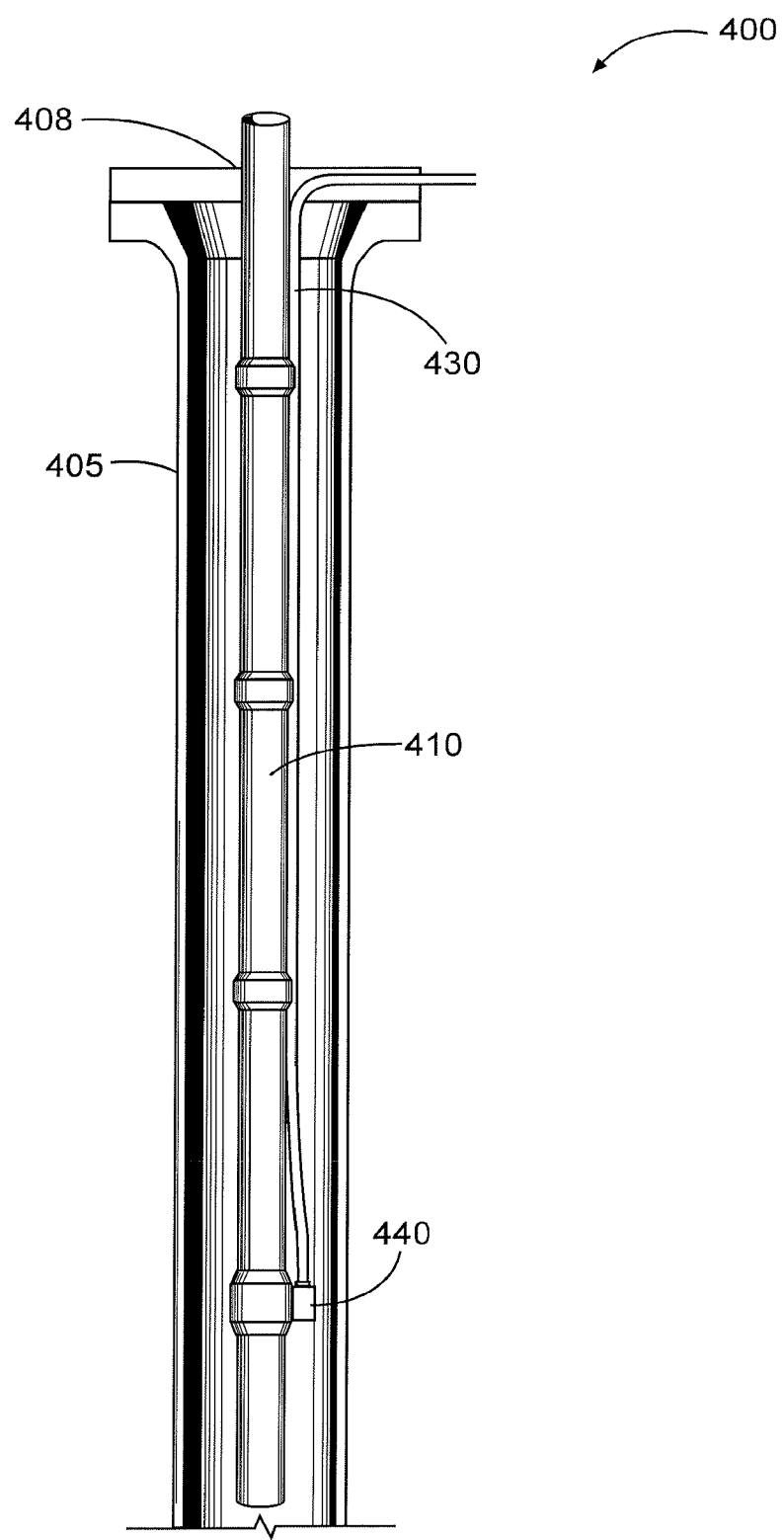
FIG. 4 is a diagram illustrating an injection system that may be used in accordance with certain embodiments of the present disclosure.

For example, a hydrate inhibitor of the present disclosure may be introduced into a well bore and/or tubing using a capillary injection system as shown in FIG. 4. Referring now to FIG. 4, well bore 405 has been drilled to penetrate a portion of a subterranean formation 400. A tubing 410 (e.g., production tubing) has been placed in the well bore 405. A capillary injection tube 430 is disposed in the annular space between the outer surface of tubing 410 and the inner wall of well bore 405. The capillary injection tube 430 is connected to a side-pocket mandrel 440 at a lower section of the tubing 410. A hydrate inhibitor may be injected into capillary injection tube 430 at the wellhead 408 at the surface such that it mixes with production fluid at or near the side-pocket mandrel 440. As the production fluid flows through the tubing 410, the hydrate inhibitors may prevent the formation of one or more hydrates within the tubing 410. Other capillary injection systems and side pocket mandrel devices (e.g., those used in gas lift production) may be used in a similar manner to the system shown in FIG. 4.

In certain embodiments, a hydrate inhibitor of the present disclosure may be added to a conduit such as a pipeline where one or more fluids enter the conduit and/or at one or more other locations along the length of the conduit. In these embodiments, the hydrate inhibitor may be added in batches or injected substantially continuously while the pipeline is being used.

Once introduced into a fluid, subterranean formation, well bore, pipeline, or other location, the hydrate inhibitor may inhibit the formation of one or more hydrates within the fluid, subterranean formation, well bore, pipeline, or other location.

In a 1st embodiment, the present disclosure may provide a method of inhibiting the formation of hydrate agglomerates comprising: introducing a composition into a fluid comprising (i) water and (ii) one of gas, liquid hydrocarbon, and combinations thereof; wherein the composition comprises an LDHI compound having the structural formula:

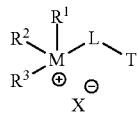

Each of $R^1$, $R^2$, and $R^3$ is independently selected from the group consisting of: hydrogen, a $C_1$ to $C_{12}$ hydrocarbon chain, and combinations thereof; M is selected from the group consisting of nitrogen and phosphorous; X is an anion selected from the group consisting of halide, carboxylate, sulfate, organic sulfonate, hydroxide, and combinations thereof; and L is a $C_1$ to $C_{20}$ hydrocarbon chain. T is selected from the group consisting of compounds having the following structural formulas:

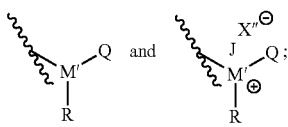

wherein R is a $C_1$ to $C_{20}$ hydrocarbon chain; J is selected from the group consisting of hydrogen, a $C_1$ to $C_6$ hydrocarbon chain, and combinations thereof; X" is an anion selected from the group consisting of halide, carboxylate, sulfate, organic sulfonate, hydroxide, and combinations thereof; M' is selected from the group consisting of nitrogen and phosphorous; and Q is selected from the group consisting of: H, a $C_1$ to $C_{20}$ hydrocarbon chain, alkyl amine, alkenyl amine, alkynyl amine, aryl amine, alkyl phosphine, alkenyl phosphine, alkynyl phosphine, aryl phosphine, alkyl ammonium, alkenyl ammonium, alkynyl ammonium, aryl ammonium, alkyl phosphonium, alkenyl phosphonium, alkynyl phosphonium, aryl phosphonium, and combinations thereof.

A 2nd embodiment may include a method according to the first embodiment, further wherein Q may have the structural formula:

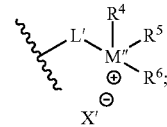

wherein: L' is a $C_1$ to $C_{20}$ hydrocarbon chain; M" is selected from the group consisting of nitrogen and phosphorous; X' is an anion selected from the group consisting of halide, carboxylate, sulfate, organic sulfonate, hydroxide, and combinations thereof; and each of $R^1$, $R^2$, and $R^3$ is independently selected from the group consisting of: hydrogen, a $C_1$ to $C_{12}$ hydrocarbon chain, and combinations thereof.

A 3rd embodiment may include a method according the second embodiment, further wherein each of L and L' independently has the structure:

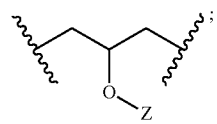

wherein Z of each of L and L' is independently selected from the group consisting of: hydrogen, $R^7(CO)-$, $(CH_2CH_2O)_n$, $(CH_2CH(CH_3)O)_n$, $R^7SO_2^-$, $R^7(SO_2)O-$, $R^7$, and combinations thereof; wherein $R^7$ is a $C_1$ to $C_{20}$ hydrocarbon chain, and further wherein n ranges from 1 to 10.

A 4th embodiment may include a method according to any one of the second and third embodiments, wherein L has the same structure as L'.

A 5th embodiment may include a method according to any one of the foregoing embodiments, wherein the LDHI compound has the structural formula:

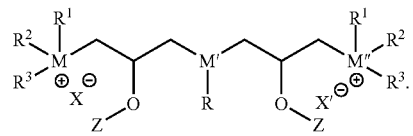

A 6th embodiment may include a method according to any one of the foregoing embodiments wherein each of $R^1$, $R^2$, and $R^3$ is a $C_2$ to $C_8$ chain, and further wherein R is a $C_8$ to $C_{18}$ hydrocarbon chain.

A 7th embodiment may include a method according to any one of the foregoing embodiments, wherein the fluid resides within a conduit.

An 8th embodiment may include a method according to any one of the foregoing embodiments, wherein the composition further comprises an acid selected from the group consisting of: acrylic acid, acetic acid, hydrochloric acid, citric acid, and combinations thereof.

A 9th embodiment may include a method comprising: introducing a composition into a fluid comprising (i) water and (ii) one of gas, liquid hydrocarbon, and combinations thereof; wherein the composition comprises an LDHI compound or a salt thereof, the LDHI compound comprising multiple cationic hydrophilic heads, a lipophilic tail, and a linking group.

A 10th embodiment may include a method according to the ninth embodiment, wherein the LDHI compound comprises two cationic hydrophilic heads for every one lipophilic tail of the compound.

An 11th embodiment may include a method according to either of the 9th or 10th embodiments, wherein the LDHI compound further comprises a non-cationic hydrophilic head selected from the group consisting of amine and phosphine.

A 12th embodiment may include a method according to any one of the 9th through 11th embodiments, wherein the LDHI compound comprises three hydrophilic heads for every one lipophilic tail of the compound.

A 13th embodiment may include a method according to any one of the 9th through 12th embodiments, wherein each cationic hydrophilic head independently is selected from the group consisting of: quaternary ammonium cation moiety; tertiary ammonium cation moiety; and phosphonium cation moiety.

A 14th embodiment may include a method according to any one of the 9th through 13th embodiments wherein each cationic hydrophilic head comprises a moiety having the chemical formula $R^1R^2R^3M^+$, wherein each of $R^1$, $R^2$, and $R^3$ is a $C_2$ to $C_8$ hydrocarbon chain independently selected from the group consisting of alkyl, alkenyl, alkynyl, aryl, and combinations thereof; and wherein M is either nitrogen or phosphorous.

A 15th embodiment may include a method according to any one of the 9th through 14th embodiments, wherein the lipophilic tail is a $C_8$ to $C_{18}$ hydrocarbon chain.

A 16th embodiment may include a method according to any one of the 14th and 15th embodiments, wherein the lipophilic tail comprises more carbon atoms than each one of $R^1$, $R^2$, and $R^3$.

A 17th embodiment may include a method according to any of the 14th through 16th embodiments, wherein each of $R^1$, $R^2$, and $R^3$ is $C_3H_7$, and wherein the lipophilic tail is a $C_{12}$ to $C_{16}$ hydrocarbon chain.

An 18th embodiment may include a method according to any one of the 9th through 17th embodiments, wherein the LDHI compound comprises the reaction product of a reaction process that comprises (i) a first reaction between a long-chain primary amine and an epihalohydrin, and (ii) a second reaction between the product of the first reaction with a secondary or tertiary amine.

A 19th embodiment may include a method according to any one of the 9th through 18th embodiments, wherein the composition is introduced in an amount such that the LDHI compound is present in the fluid in an amount equal to about 0.1 to about 3.0% volume based on water cut of the fluid.

A 20th embodiment may include a method according to any one of the 9th through 19th embodiments, wherein the fluid resides within a conduit.

A 21st embodiment may include a method according to any one of the 1st through 20th embodiments, wherein the fluid has a water cut of 30% or more.

A 22nd embodiment may include a method according to any one of the 1st through 20th embodiments, wherein the fluid has a water cut of 40% or more.

A 23rd embodiment may include a method according to any one of the 1st through 20th embodiments, wherein the fluid has a water cut of 50% or more.

A 24th embodiment may include a method according to any one of the 1st through 20th embodiments, wherein the fluid has a water cut of between about 30% and about 60%.

A 25th embodiment may include a method according to any one of the foregoing embodiments, wherein the fluid resides within a subterranean formation.

A 25th embodiment includes a composition comprising a compound having the structural formula:

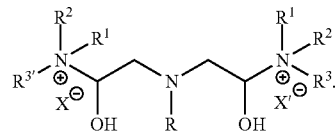

wherein: each of $R^1$, $R^2$, and $R^3$ is selected from the group consisting of hydrogen and a $C_2$ to $C_8$ hydrocarbon chain; each of X and X' is an anion selected from the group consisting of halide, carboxylate, sulfate, organic sulfonate, hydroxide, and combinations thereof; and R comprises a hydrocarbon chain that comprises more carbon atoms than each one of $R^1$, $R^2$, and $R^3$.

A 26th embodiment includes a composition according to the 25th embodiment, wherein each of $R^1$, $R^2$, and $R^3$ is linear $C_3H_7$ and R is a $C_{12}$ to $C_{16}$ hydrocarbon chain.

A 27th embodiment includes a composition according to any one of the 25th through 26th embodiments, wherein R is unsubstituted.

A 28th embodiment includes a composition according to the 25th embodiment, wherein each of $R^1$, $R^2$, and $R^3$ is linear $C_4H_9$ and R is a $C_{12}$ to $C_{16}$ hydrocarbon chain.

A 29th embodiment includes a composition according to the 25th embodiment, wherein $R^1$ is hydrogen, each of $R^2$ and $R^3$ is linear $C_3H_7$, and R is a $C_{12}$ to $C_{16}$ hydrocarbon chain.

A 30th embodiment includes a composition according to any one of the 25th-29th embodiments, further comprising a solvent selected from the group consisting of: toluene, xylene, methanol, isopropyl alcohol, glycol, and combinations thereof.

To facilitate a better understanding of the present disclosure, the following examples of some embodiments are given. In no way should such examples be read to limit the scope of the invention.

EXAMPLE

A. Methodology

Rocking cell tests were carried out on numerous samples of different compounds having structures according to some embodiments of the present disclosure. Rocking cell tests involve injection of oil, water, and LDHI compound into a cell at representative conditions. Optionally, additional gas may be injected into the cell (e.g., to achieve a desired working pressure during the experiment). Each cell was of a fixed volume and contained constant mass during the experiment; that is, oil, water, LDHI compound, and (in some cases) gas were injected at the beginning of the experiment, but thereafter the cell was closed to mass transfer in or out of the cell. Each cell also included a magnetic ball in the space where fluids are injected. The ball aided in agitation of the fluids during rocking. In addition, magnetic sensors on both ends of the cell detected whether the magnetic ball's movements through the fluids were hindered during rocking, thereby indicating the presence of hydrates. The cell also permitted visual observation of its contents for formation of hydrates during the experiment.

Initially, amounts of oil, water, and LDHI compound were injected into the cell so as to achieve the desired water cut (i.e., fraction of aqueous phase in the total fluid) and LDHI compound dosage (volume % of LDHI compound on water cut basis) of the experiment. As performed in this instance, three different water cuts were used in each of 3 different test runs for each sample: 30%, 40%, and 50%. Dosage for LDHI compounds in all tests was 2.0% volume on water cut basis. After injection of oil, water, and LDHI compound, gas was injected to reach a desired pressure (e.g., working pressure of a conduit of interest for evaluation of the LDHI compound, in this case around 2,000 psi). Gas composition varied based upon the conditions that would be encountered in the target conduit for the LDHI compound.

Following injection of the gas, the cell was closed and rocked for approximately 2 hours to emulsify the fluids therein. Temperature is then ramped down from 20° C. to 4° C. over a period of about 2 hours, and rocking is continued for around 14 hours after the temperature reaches final temperature. The rocking is then stopped for a period of time while the cell is horizontal (e.g., to simulate a system shut-in). This "shut-in" period lasts for at least 6 hours, varying only so that the re-start of rocking could be visually observed. Visual observations of the contents of the cell are made throughout the tests, with particular attention paid to the following three phases of the test: (1) initial cooling period; (2) pre-shut-in; and (3) restart following shut-in. These three phases of the testing provide a basis for visual rating of the performance of the LDHI compound as a hydrate inhibitor. Visual ranking results in a score at each phase, based upon a scale of 1 through 5 according to the criteria set forth in Table 1 below. For systems with dark oils additional confirmation may be required via the signal from the magnetic proximity sensors' detection of movement of the magnetic ball.

TABLE 1

Rocking Cell Visual Rating Criteria for Hydrate Inhibitors

| Grade | Description |
|---|---|
| 5 | No or Ultra-fine Hydrate Crystals; Fully Flowable System<br>No visible deposits on cell body or sapphire window.<br>Full liquid level.<br>Single phase or multiple, easily dispersible phases (i.e., brine, oil & hydrates).<br>Low viscosity liquid(s).<br>Ultra-fine hydrate crystal particle size (if present; hydrates may look like 'milk'). |
| 4 | Larger Hydrate Particles and/or More Viscous Liquid than Grade 5; Flowable System<br>Small quantities of intermittent visible deposits on cell body or sapphire window<br>Full liquid level.<br>Single phase or multiple, easily dispersible phases (i.e., brine, oil & hydrates).<br>Low liquid viscosity.<br>Fine hydrate crystal particle size if present ($\leq 2$ mm).<br>Weak hydrate crystal association if present. |
| 3 | System will Flow with Difficulty<br>Intermittent visible deposits on cell body or sapphire window<br>Full liquid level.<br>Liquid is viscous and slowly dispersible.<br>Intermediate liquid viscosity.<br>Fine hydrate crystal particles ($\leq 2$ mm).<br>No large crystals |
| 2 | System will Most Likely Plug<br>Visible deposits on cell body or sapphire window<br>Full or low liquid level.<br>Visible hydrate crystal deposits.<br>Stuck ball.<br>Large solid crystals (>3 mm) may break with strong agitation. |

TABLE 1-continued

Rocking Cell Visual Rating Criteria for Hydrate Inhibitors

| Grade | Description |
|---|---|
| 1 | System will Plug<br>Visible deposits on cell body or sapphire window<br>Low liquid level.<br>Stuck ball.<br>Two phases, one will disperse.<br>Exceedingly high liquid viscosity.<br>Large agglomerations (>3 mm).<br>Large solid crystals do not break with strong agitation. |

B. Testing of Particular Hydrate Inhibitor Compound Samples

Samples were prepared including compounds with structures according to some embodiments of the present disclosure. Samples prepared had the following base structure:

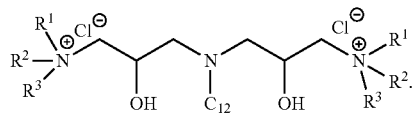

Each sample had $R^1$, $R^2$, and $R^3$ as defined in Table 2 below:

TABLE 2

Sample LDHI Compounds and Rocking Cell Test Results

| Samples No. | R1 | R2 | R3 | Dose (%) | Water Cut 30% | Water Cut 40% | Water Cut 50% |
|---|---|---|---|---|---|---|---|
| 1 | $CH_3$ | $CH_3$ | $C_{12}H_{25}$ | 2.0% | 1 | — | — |
| 2 | n-$C_4H_9$ | n-$C_4H_9$ | n-$C_4H_9$ | 2.0% | 5 | 5 | 2 |
| 3 | n-$C_3H_7$ | n-$C_3H_7$ | n-$C_3H_7$ | 2.0% | 5 | 5 | 5 |
| 4 | $CH_3H_7$ | $CH_3H_7$ | n-$C_4H_9$ | 2.0% | 5 | 1 | — |
| 5 | $C_2H_5$ | $C_2H_5$ | $C_2H_5$ | 2.0% | 2 | — | — |
| 6 | $CH_3$ | $CH_3$ | iso-$C_3H_7$ | 2.0% | 1 | — | — |
| 7 | $CH_3$ | $CH_3$ | Benzyl | 2.0% | 5 | 1 | — |
| 8 | $C_2H_5$ | $C_2H_5$ | Benzyl | 2.0% | 2 | — | — |
| 9 | H | n-$C_3H_7$ | n-$C_3H_7$ | 2.0% | 5 | 5 | 1 |
| 10 | n-$C_5H_{11}$ | n-$C_5H_{11}$ | n-$C_5H_{11}$ | 2.0% | 1 | — | — |
| 11 | $CH_3$ | H | Benzyl | 2.0% | 1 | — | — |
| 12 | $C_2H_5$ | H | Benzyl | 2.0% | 2 | — | — |
| 13 | $CH_3$ | $CH_3$ | $C_{12}H_{25}$ | 2.0% | 1 | — | — |

As also indicated by Table 2, each sample was applied at the indicated dosage (2.0% volume based on water cut) to fluids having one or more of 3 different water cuts: 30%, 40%, and 50%. Where no grade is indicated for a water cut in Table 2, no test at that water cut was performed for the corresponding sample. In general, samples that obtained a score in the range of 3-5 at 30% water cut were then tested at 40% water cut, and samples obtaining a score of 3-5 at 40% were then tested at 50% water cut. As shown by Table 2, Sample 3 obtained a score of 5 at all 3 water cuts tested. Samples 2 and 9 each obtained scores of 5 at water cuts of 30% and 40%, but a score in the 1-2 range at 50%.

Example 2

A second test was carried out according to the methodology of Example 1. This time, LDHI compound samples were each injected into the cell as part of a composition comprising the LDHI compound sample and further comprising acrylic acid (prop-2-enoic acid) in a 1:1 molar ratio, as shown in the following base composition for all samples:

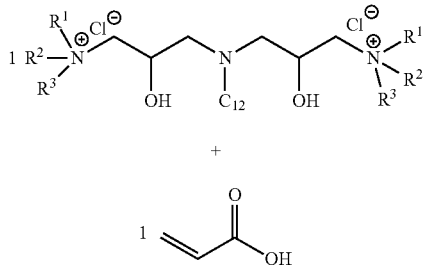

Also, each test was carried out only at 30% water cut. Table 3 below displays the results for each of the 9 samples of this experiment.

TABLE 3

Sample LDHI Compounds and Rocking Cell Test Results

| Samples No. | R1 | R2 | R3 | Dose (%) | Water Cut 30% | Water Cut 40% | Water Cut 50% |
|---|---|---|---|---|---|---|---|
| 1 | $CH_3$ | $CH_3$ | $C_{12}H_{25}$ | 2.0% | 1-2 | — | — |
| 2 | n-$C_4H_9$ | n-$C_4H_9$ | n-$C_4H_9$ | 2.0% | 1-2 | — | — |
| 3 | n-$C_3H_7$ | n-$C_3H_7$ | n-$C_3H_7$ | 2.0% | 3 | 1 | — |
| 4 | $CH_3H_7$ | $CH_3H_7$ | n-$C_4H_9$ | 2.0% | 1-2 | — | — |
| 5 | $C_2H_5$ | $C_2H_5$ | $C_2H_5$ | 2.0% | 1-2 | — | — |
| 6 | $CH_3$ | $CH_3$ | iso-$C_3H_7$ | 2.0% | 1-2 | — | — |
| 7 | $CH_3$ | $CH_3$ | Benzyl | 2.0% | 4 | 1 | — |
| 8 | $C_2H_5$ | $C_2H_5$ | Benzyl | 2.0% | 5 | 5 | 2 |
| 9 | H | n-$C_3H_7$ | n-$C_3H_7$ | 2.0% | 5 | 1 | — |

As shown in Table 3, Sample 3 (the same as in the test of Example 1) obtained a score of 3, but Samples 7, 8, and 9 scored 4, 5, and 5, respectively. The better performance of Sample 3 in Example 1 may indicate that, at least under certain conditions, acidization of an LDHI compound according to some embodiments (e.g., to create an additional cation moiety) may not always result in performance increase as an LDHI hydrate inhibitor, as compared to the non-acidized compound. On the other hand, the better performance of acidized Sample 8 following acidization relative to its performance without acidization reaction shows that acidization may result in improved hydrate inhibition in other embodiments.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
introducing a composition into a fluid comprising (i) water and (ii) one of gas, liquid hydrocarbon, and combinations thereof;
wherein the composition comprises a low dosage hydrate inhibitor (LDHI) compound or a salt thereof, the LDHI compound comprising multiple cationic hydrophilic heads comprising a moiety having the chemical formula $R^1R^2R^3M^+$, wherein each of $R^1$, $R^2$, and $R^3$ is a $C_2$ to $C_8$ hydrocarbon chain independently selected from the group consisting of alkyl, alkenyl, alkynyl, aryl, and combinations thereof, and wherein M is either nitrogen or phosphorous; a lipophilic tail comprising more carbon atoms than each one of $R^1$, $R^2$, and $R^3$; and a linking group, wherein the LDHI compound comprises two cationic hydrophilic heads for every one lipophilic tail of the compound and wherein the LDHI compound comprises the reaction product of a reaction process that comprises (i) a first reaction between a long-chain primary amine and an epihalohydrin, and (ii) a second reaction between the product of the first reaction with a secondary or tertiary amine.

2. The method of claim 1, wherein the lipophilic tail is a $C_8$ to $C_{18}$ hydrocarbon chain.

3. The method of claim 1, wherein each of $R^1$, $R^2$, and $R^3$ is $C_3H_7$, and wherein the lipophilic tail is a $C_{12}$ to $C_{16}$ hydrocarbon chain.

4. A method comprising:
introducing a composition into a fluid comprising (i) water and (ii) one of gas, liquid hydrocarbon, and combinations thereof;
wherein the composition comprises a low dosage hydrate inhibitor (LDHI) compound, the LDHI compound having the structural formula:

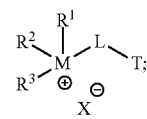

wherein each of $R^1$, $R^2$, and $R^3$ is independently selected from the group consisting of: hydrogen, a $C_1$ to $C_{12}$ hydrocarbon chain, and combinations thereof;
wherein M is selected from the group consisting of nitrogen and phosphorous;
wherein X is an anion selected from the group consisting of halide, carboxylate, sulfate, organic sulfonate, hydroxide, and combinations thereof;
wherein each of L and L' independently has the structural formula:

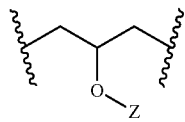

wherein Z of each of L and L' is independently selected from the group consisting of: hydrogen, $R^7(CO)—$, $(CH_2CH_2O)_n$, $(CH_2CH(CH_3)O)_n$, $R^7SO_2—$, $R^7(SO_2)O$—, $R^7$, and combinations thereof; wherein $R^7$ is a $C_1$ to $C_{20}$ hydrocarbon chain; and further wherein n ranges from 1 to 10;

wherein T is selected from the group consisting of compounds having the following structural formulas:

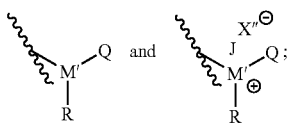

wherein R is a $C_1$ to $C_{20}$ hydrocarbon chain;

wherein J is selected from the group consisting of hydrogen, a $C_1$ to $C_6$ hydrocarbon chain, and combinations thereof;

wherein X" is an anion selected from the group consisting of halide, carboxylate, sulfate, organic sulfonate, hydroxide, and combinations thereof;

wherein M' is selected from the group consisting of nitrogen and phosphorous; and wherein Q has the structural formula:

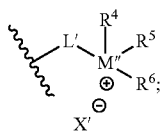

wherein each of L and L' independently has the structural formula:

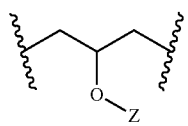

wherein Z of each of L and L' is independently selected from the group consisting of: hydrogen, $R^7(CO)$—, $(CH_2CH_2O)_n$, $(CH_2CH(CH_3)O)_n$, $R^7SO_2$—, $R^7(SO_2)O$—, $R^7$, and combination thereof; wherein $R^7$ is a $C_1$ to $C_{20}$ hydrocarbon chain; and further wherein a ranges from 1 to 10;

wherein M" is selected from the group consisting of nitrogen and phosphorous;

wherein X' is an anion selected from the group consisting of halide, carboxylate, sulfate, organic sulfonate, hydroxide, and combinations thereof; and wherein each of $R^4$, $R^5$, and $R^6$ is independently selected from the group consisting of: hydrogen, a $C_1$ to $C_{12}$ hydrocarbon chain, and combinations thereof.

5. A method comprising:

introducing a composition into a fluid comprising (i) water and (ii) one of gas, liquid hydrocarbon, and combinations thereof;

wherein the composition comprises a low dosage hydrate inhibitor (LDHI) compound, the LDHI compound having the structural formula:

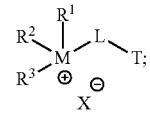

wherein each of $R^1$, $R^2$, and $R^3$ is independently selected from the group consisting of: hydrogen, a $C_1$ to $C_{12}$ hydrocarbon chain, and combinations thereof;

wherein M is selected from the group consisting of nitrogen and phosphorous;

wherein X is an anion selected from the group consisting of halide, carboxylate, sulfate, organic sulfonate, hydroxide, and combinations thereof;

wherein L is a substituted $C_1$ to $C_{20}$ hydrocarbon chain; and wherein T is selected from the group consisting of compounds having the following structural formulas:

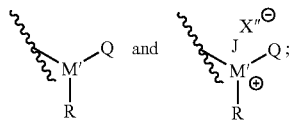

wherein R is an unsubstituted $C_8$ to $C_{20}$ hydrocarbon chain;

wherein J is selected from the group consisting of hydrogen, a $C_1$ to $C_6$ hydrocarbon chain, and combinations thereof;

wherein X" is an anion selected from the group consisting of halide, carboxylate, sulfate, organic sulfonate, hydroxide, and combinations thereof;

wherein M' is selected from the group consisting of nitrogen and phosphorous; and wherein Q has the structural formula:

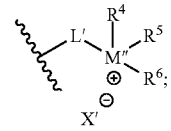

wherein L' is a substituted $C_1$ to $C_{20}$ hydrocarbon chain;

wherein M" is selected from the group consisting of nitrogen and phosphorous;

wherein X' is an anion selected from the group consisting of halide, carboxylate, sulfate, organic sulfonate, hydroxide, and combinations thereof; and wherein each of $R^4$, $R^5$, and $R^6$ is independently selected from the group consisting of: hydrogen, a $C_1$ to $C_{12}$ hydrocarbon chain, and combinations thereof.

6. The method of claim 5, wherein each of L and L' independently has the structural formula:

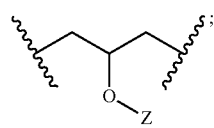

wherein Z of each of L and L' is independently selected from the group consisting of: hydrogen, $R^7(CO)$—, $(CH_2CH_2O)_n$, $(CH_2CH(CH_3)O)_n$, $R^7SO_2^-$, $R^7(SO_2)O$—, $R^7$, and combinations thereof; wherein $R^7$ is a $C_1$ to $C_{20}$ hydrocarbon chain, and further wherein n ranges from 1 to 10.

7. The method of claim 6, wherein L has the same structure as L'.

8. The method of claim 7, wherein the LDHI compound has the structural formula:

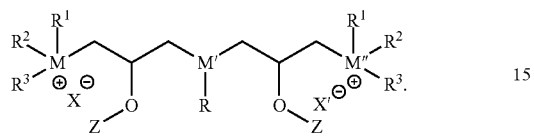

9. The method of claim 8, wherein each of $R^1$, $R^2$, and $R^3$ is a $C_2$ to $C_8$ hydrocarbon chain, and further wherein R is an unsubstituted $C_8$ to $C_{18}$ hydrocarbon chain.

10. The method of claim 9, wherein each of $R^1$, $R^2$, and $R^3$ is linear $C_3H_7$, and further wherein R is an unsubstituted $C_{12}$ to $C_{16}$ hydrocarbon chain.

11. The method of claim 5, wherein the fluid resides within a conduit.

12. The method of claim 5, wherein the fluid has a water cut of 50% or more.

* * * * *